United States Patent
Fujino

(10) Patent No.: US 9,622,304 B2
(45) Date of Patent: Apr. 11, 2017

(54) LOAD DRIVING CIRCUIT

(71) Applicant: DENSO CORPORATION, Kariya, Aichi-pref. (JP)

(72) Inventor: Takeshi Fujino, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/000,149

(22) Filed: Jan. 19, 2016

(65) Prior Publication Data

US 2016/0212808 A1    Jul. 21, 2016

(30) Foreign Application Priority Data

Jan. 21, 2015    (JP) ..................... 2015-9448

(51) Int. Cl.
*H05B 33/08*      (2006.01)
*G09G 3/34*       (2006.01)

(52) U.S. Cl.
CPC ....... *H05B 33/0815* (2013.01); *G09G 3/3406* (2013.01); *H05B 33/0845* (2013.01); *H05B 33/0884* (2013.01)

(58) Field of Classification Search
CPC ............ H05B 33/0815; H05B 33/0848; H05B 33/0824; H05B 33/089; H05B 41/2828; H05B 33/0884; G09G 3/3406; H02H 3/12; H02M 3/156; H03K 17/0822
See application file for complete search history.

(56) References Cited

U.S. PATENT DOCUMENTS

| | | | | |
|---|---|---|---|---|
| 6,229,355 B1* | 5/2001 | Ogasawara | ........ | H03K 17/0822 326/85 |
| 7,492,135 B2* | 2/2009 | Saeki | .................. | H02M 3/1588 323/246 |
| 7,733,030 B2* | 6/2010 | Brokaw | .................. | H02M 1/36 315/209 R |
| 8,018,209 B2* | 9/2011 | Kuo | ..................... | H02M 3/156 323/224 |
| 8,106,640 B2* | 1/2012 | Itakura | ................... | H02M 1/32 323/272 |

(Continued)

FOREIGN PATENT DOCUMENTS

| JP | 2007-305929 A | 11/2007 |
|---|---|---|
| JP | 2009-284576 A | 12/2009 |

(Continued)

*Primary Examiner* — Vibol Tan
(74) *Attorney, Agent, or Firm* — Posz Law Group, PLC

(57) ABSTRACT

A load driving circuit includes: a driving circuit that supplies a predetermined voltage to a load element connected to an output terminal by a repetitive pulse; a capacitor that is connected between the output terminal and a terminal having a predetermined potential level; a comparison circuit that compares a voltage of the output terminal and a threshold voltage; and a determination circuit that, when the driving circuit is in a driven state, determines an open circuit fault state in a case where a comparative output is not obtained before a predetermined time elapses after a time point where the repetitive pulse into the load element is cut off. The comparative output indicates a change in which the output voltage from the comparison circuit reaches the threshold voltage. The open circuit fault state is a state in which the load element is disconnected from the output terminal.

9 Claims, 10 Drawing Sheets

(56) References Cited

U.S. PATENT DOCUMENTS

| | | | |
|---|---|---|---|
| 8,183,848 B2* | 5/2012 | Kuo | H02M 3/1563 |
| | | | 323/225 |
| 8,531,113 B2* | 9/2013 | Jung | H05B 33/0815 |
| | | | 315/122 |
| 8,742,691 B2* | 6/2014 | Imanaka | H05B 41/2828 |
| | | | 315/209 R |
| 9,177,508 B2* | 11/2015 | Kikuchi | H05B 33/0815 |
| 2005/0083066 A1 | 4/2005 | Tani et al. | |
| 2012/0050697 A1 | 3/2012 | Suzuki | |
| 2013/0241417 A1 | 9/2013 | Sakuma | |
| 2014/0168567 A1* | 6/2014 | Kikuchi | H05B 33/0815 |
| | | | 349/61 |
| 2016/0087526 A1* | 3/2016 | Satake | H02M 1/36 |
| | | | 323/282 |

FOREIGN PATENT DOCUMENTS

| | | |
|---|---|---|
| JP | 2010-244720 A | 10/2010 |
| JP | 2011-253783 A | 12/2011 |
| JP | 2012-160392 A | 8/2012 |

\* cited by examiner

FIG. 5

|  | PWM IN OFF | PWM IN OPR | |
|---|---|---|---|
|  |  | ON DUTY | OFF DUTY |
| OPN CIR FALT (S1 OFF) [OPN CIR FALT ST] | × | × | ○ |
| GND SRT CIR FALT (S3 ON) [LOAD-SIDE SRT CIR FALT ST] | × | ○ | × |
| BAT SRT CIR FALT (S2 ON) [POW SRC SRT CIR FALT ST] | ○ | × | × |

FIG. 11

|  | PWM IN OFF | PWM IN OPR | |
|---|---|---|---|
|  |  | ON DUTY | OFF DUTY |
| OPN CIR FALT (S1a OFF) [OPN CIR FALT ST] | × | × | ○ |
| GND SRT CIR FALT (S3a ON) [POW SRC SRT CIR FALT ST] | ○ | × | × |
| BAT SRT CIR FALT (S2a ON) [LOAD-SIDE SRT CIR FALT ST] | × | ○ | × |

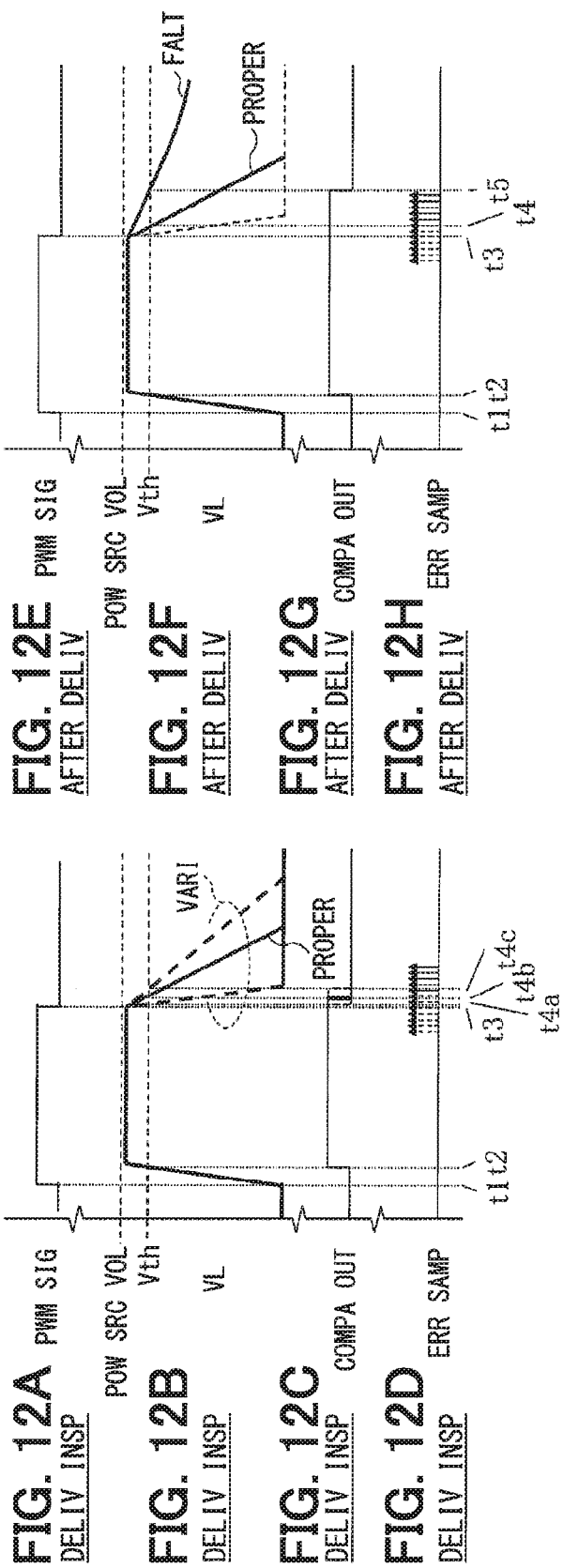

LOAD DRIVING CIRCUIT

CROSS REFERENCE TO RELATED APPLICATION

This application is based on Japanese Patent Application No. 2015-9448 filed on Jan. 21, 2015, the disclosure of which is incorporated herein by reference.

TECHNICAL FIELD

The present disclosure relates to a load driving circuit.

BACKGROUND

For a load driving circuit controlling a load element such as an LED to turn on through energization of pulse width modulation (PWM), which is a repetitive pulse, the load driving circuit includes a function that checks the state in which the load element connected to the circuit is in an open circuit state. In this situation, for example, the load element in an open circuit state is detected when a level determination is carried out after an energization state is detected with the flow of a predetermined current at the time of termination of driving the load element.

In this situation, when it is detected that a predetermined current flows through a load element such as an LED, the operation such as turning the LED on is carried out when an output terminal is a pull-up state even when a current value is minimized. Hence, a user feels a sense of discomfort to this situation.

[Patent Document 1] JP 2012-160392-A

SUMMARY

It is an object of the present disclosure to provide a load driving circuit that detects an open circuit fault state during controlling of energization when the control of energizing a load element through a repetitive pulse is carried out.

A load driving circuit according to an aspect of the present disclosure includes: a driving circuit that supplies a predetermined voltage to a load element connected to an output terminal by a repetitive pulse when the driving circuit is in a driven state; a capacitor that is connected between the output terminal and a terminal having a predetermined potential level; a comparison circuit that compares an output voltage of the output terminal and a threshold voltage, which is predetermined; and a determination circuit that, when the driving circuit is in the driven state, determines an open circuit fault state in a case where a comparative output is not obtained before a predetermined time elapses after a time point where the repetitive pulse into the load element is cut off. The comparative output indicates a change in which the output voltage from the comparison circuit reaches the threshold voltage. The open circuit fault state is a state in which the load element is disconnected from the output terminal.

Accordingly, the detection of the open circuit fault is carried out when the load element is driven so that the present disclosure does not cause any sense of discomfort to a use when the energization of the LED 1 occurs in a case where the fault is detected when the driving of the load element stops.

BRIEF DESCRIPTION OF THE DRAWINGS

The above and other objects, features and advantages of the present disclosure will become more apparent from the following detailed description made with reference to the accompanying drawings. In the drawings:

FIG. 5 shows a correspondence relation between a fault state and a detection timing;

FIG. 11 shows a correspondence relation between a fault state and a detection timing; and FIGS. 12A through 12H show operations according to a fifth embodiment.

DETAILED DESCRIPTION (First Embodiment)

The following describes a first embodiment of he present disclosure with reference to FIGS. 1 through 5.

Figure 1:
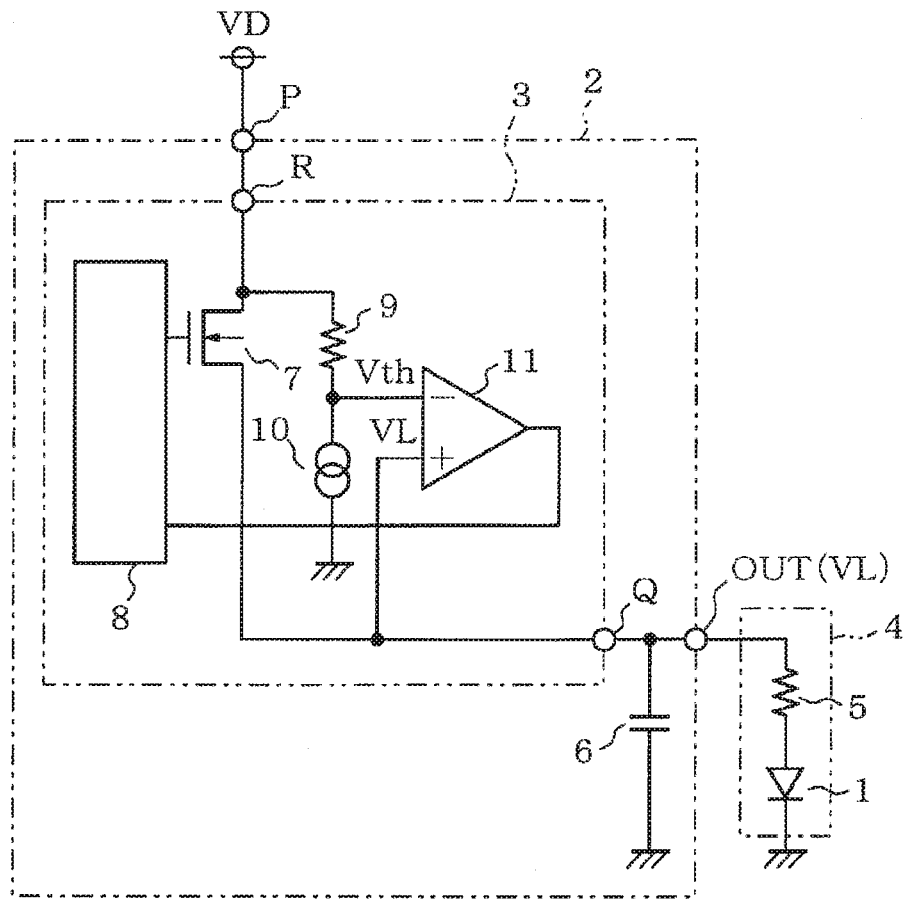
FIG. 1 is an electrical configuration according to a first embodiment.

FIG. 1 illustrates the configuration of an electronic control unit 2 (hereinafter referred to as "ECU 2") controlling a light emitting diode 1 (hereinafter referred to as "LED 1") as a load element to turn on. A variety of circuits are arranged in the ECU 2, however, an IC 3 as a driving circuit for controlling the LED 1 to turn on is arranged as the configuration for turning on the LED 1. The IC 3 is provided by the signal, which controls the LED 1 to turn on, from a microcomputer 2a (see FIG. 3) inside the ECU 2. In addition, the IC 3 sends detection information to the microcomputer 2a when an abnormality is detected when the LED is turned on.

A series circuit in which the LED 1 and a resistor 5 are connected is arranged as a load circuit 4. The load circuit 4 is connected to an output terminal OUT of the ECU 2. The output terminal Q of the IC 3 is connected to the output terminal OUT of the ECU 2, and is connected to ground through a capacitor 6. The power source terminal R of the IC 3 is connected to a direct current power source VD through a power source terminal R of the IC 3.

An n-channel MOSFET 7 for energizing the LED 1 is connected between the power source terminal R and the output terminal Q. The MOSFET 7 is provided by a gate signal for controlling PWM from a controller 8. The MOSFET 7 is used at a high-side, and the drain of the MOSFET 7 is connected to the direct current power source VD. The gate signal is driven at a voltage larger than the voltage of the direct current power source VD. The controller 8 also includes the function of a determination circuit mentioned later.

The drain of the MOSFET 7 is connected to the ground through the resistor 9 and the current source 10 in series. The resistor 9 generates a threshold voltage Vth generated at a level of a voltage drop caused by a predetermined current supplied by the current source 10. The comparator 11 is connected such that the threshold voltage Vth is inputted to an inverting input terminal from a common connection point between the resistor 9 and the current source 10.

The source of the MOSFET 7 is connected to the non-inverting input terminal of the comparator 11. The voltage Vout to be applied to the load circuit 4 is generated at the source of the MOSFET 7. Accordingly, the voltage Vout of the load circuit 4 is inputted to the non-inverting input terminal of the comparator 11. The comparator 11 outputs a high-level signal when the voltage Vout of the load circuit 4 is larger than the threshold voltage Vth. It is noted that the comparator 11 is configured to be carried out by an operation for detecting an overcurrent by a time division control in addition to the operation in the present embodiment.

Figure 2:
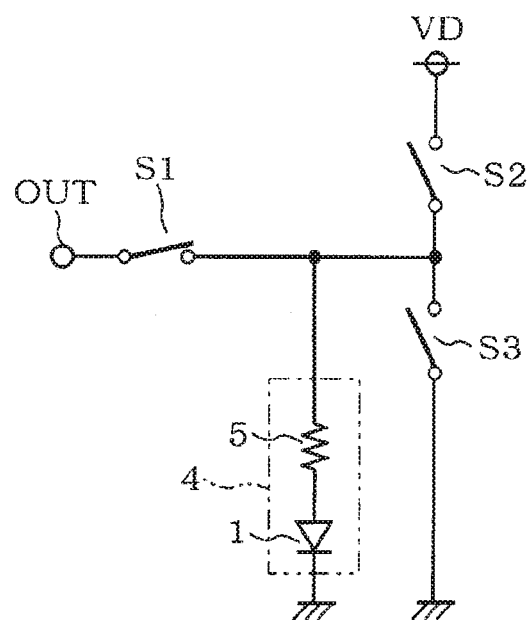
FIG. 2 is a model that illustrates a fault mode.

FIG. 2 illustrating the modeling of a fault mode of the load circuit 4 with the arrangement of switches S1 through S3. The load circuit 4 is connected to the output terminal OUT of the ECU 2 that corresponds to the connection relation illustrated in FIG. 1. This section illustrates a normal state when the switch S1 is in an on state, and illustrates an open circuit fault when the switch S1 is in an off state. In addition, the load circuit 4 is not connected to the direct current power source VD, however, this state illustrates that the switch S2 is in an off state. The state is changed to a battery short circuit fault (i.e., a source short circuit fault) when S2 is in an on state. Moreover, the load circuit 4 is not connected to the ground; however, the state shows that the switch S3 is in an off state, and the state is changed to the ground short circuit fault (i.e., a load side short circuit fault) when the switch S3 is in an on state.

Figure 3:
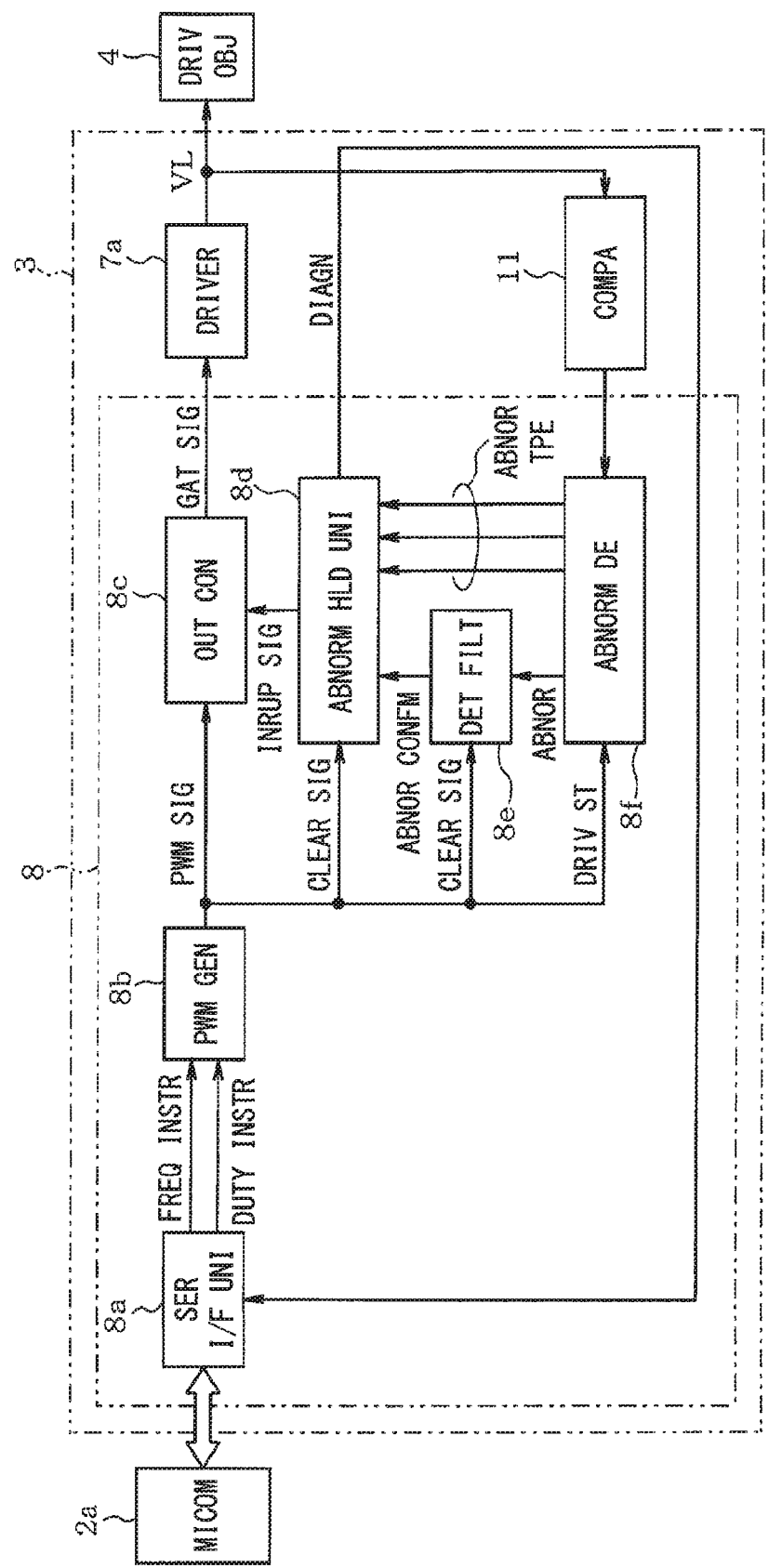
FIG. 3 is a configuration that illustrates functional blocks in a control system.

FIG. 3 illustrates a configuration having functional modules in a circuit of the IC3 that controls the driving of the driving object as the driving circuit 4. In the IC 3, the microcomputer 2 in the ECU 2 provides a control signal to a serial I/F unit 8a (i.e., an interface) in the controller 8. The control signal provided from the microcomputer 2 includes a frequency instruction signal and a Duty signal. The frequency instruction signal and the Duty signal are separated at the serial I/F unit 8a and are inputted to a PWM (pulse width modulation) generator 8b. Additionally, the serial I/F unit 8a sends an abnormal signal detected inside the serial I/F unit 8a to the microcomputer 2a.

The PWM generator 8 generates a PWM signal for driving a specified frequency and Duty and outputs the signal to the output controller 8c based on an operation signal from the microcomputer 2a. The output controller 8c provides a PWM gate signal to the gate of the MOSFET 7 indicated as the driver 7. It is noted that the output controller 8c is configured such that the gate signal is not sent to the driver 7 (i.e., the MOSFET 7) when an interruption signal is sent in response to an abnormal state from an abnormality holder 8d.

An abnormality confirmation signal is inputted to the abnormality holder 8d from a detection filter 8e, and a signal indicative of an abnormality type is inputted to the abnormality holder 8d from an abnormality determinator 8f. The abnormality determinator 8f determines an abnormal state or an abnormal type based on an output signal from a comparator 11 and a PWM signal from the PWM generator 8b.

The comparator 11 monitors an output state of the driver 7. The comparator 11 compares the potential, which is supplied from the driver 7, at the output terminal Q connected to the load circuit 4 indicated as the driving object 4 to a predetermined threshold voltage, and determines whether an abnormality occurs.

A PWM signal is inputted to the abnormality determinator 8f from the PWM generator 8b, the abnormality determinator 8f can assign the output of the comparator at the time of the driver in a normal operation as an expectation value based on a signal having an on-duty or a signal having an off-duty indicative of the driving state of the driver 7. The abnormality determinator 8f compares an actual output signal of the comparator 11 to an expectation value so as to determine whether the driver 7 is in a normal state or an abnormal state, and further determines the type of the abnormal state.

The detection filter 8e determines whether the abnormal state determined by the abnormality determinator 8f is temporary caused by a state transition with the use of a predetermined time filter. In this situation, the detection filter 8e makes a clear signal to be effective at each PWM edge and starts abnormality counting for measuring how long has the abnormal state been elapsed from the PWM edge as the timing of switching between the on-duty signal and the off-duty signal.

The abnormality holder 8d detects an abnormal signal, which is not temporary, to be outputted as passing the filter time from the detection filter 8e, and holds the abnormal signal. At this time, the abnormality holder 8d outputs an output interruption signal to the output controller 8c in response to the type of abnormality and protects the driver 7 by interrupting an output from the driver 7 in order to prevent from damaging the driver 7.

Figure 4:
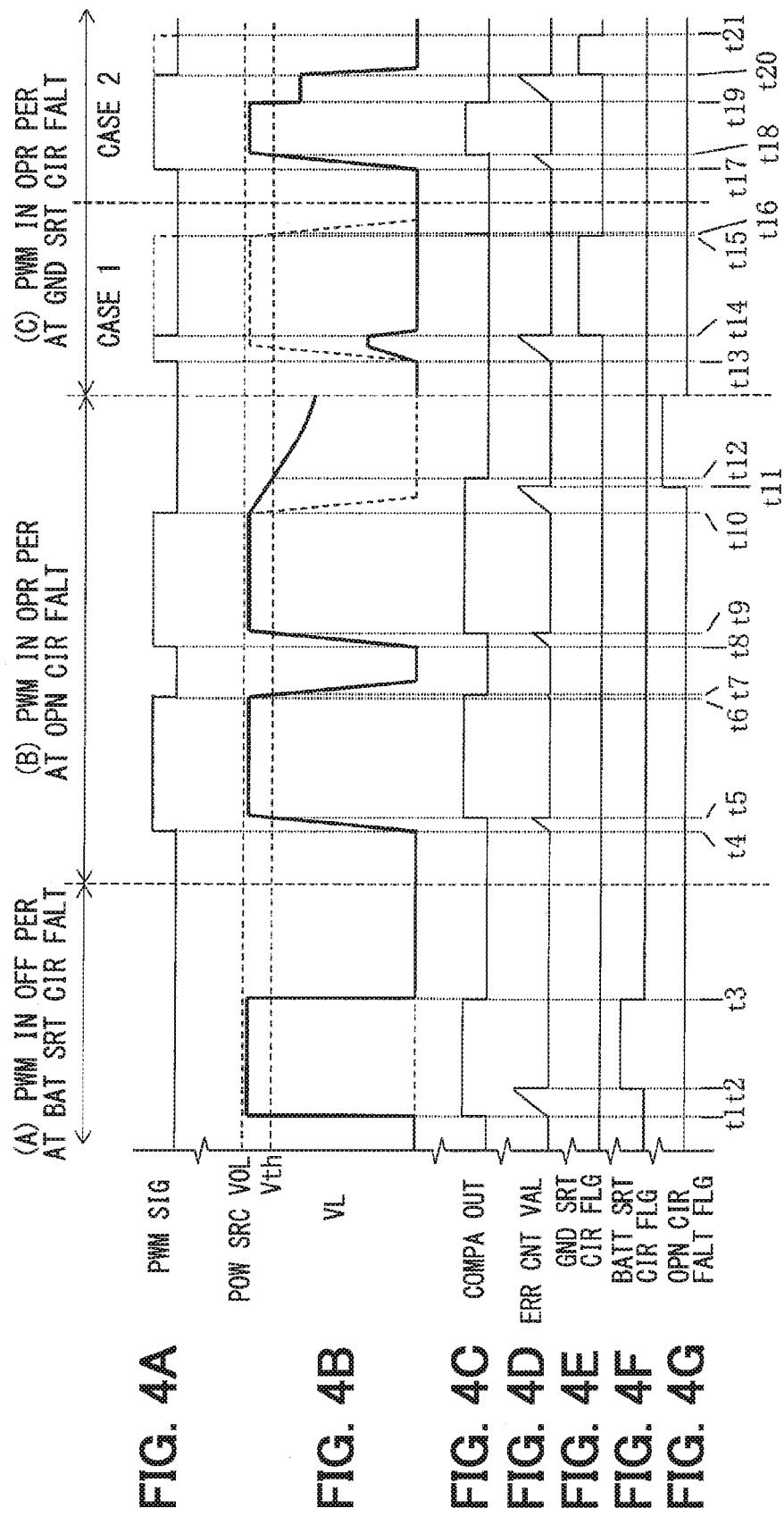
FIGS. 4A through 4G are time charts that indicate a signal in each respective module according to a second embodiment.

The following describes the operation of the above configuration also with reference to FIG. 4. For the circuit illustrated in FIG. 1, when the controller 8 outputs a signal to drive the gate of the MOSFET 7, and the power source voltage VD is almost applied to the output terminal Q when the MOSFET 7 is in an on state, and an electric charge is charged to the capacitor 6 and hence the terminal voltage rises so that the LED 1 in the load circuit 4 connected to the output terminal OUT is energized, and the LED 1 is turned on. When the MOSFET 7 is turned off, then the electric charge in the capacitor 6 is discharged and the output voltage VL of the output terminal OUT drops, and hence the energization of the LED 1 stops and the LED 1 is turned off.

The controller 8 in the IC 3 monitors the state of the output voltage VL of the output terminal OUT of the ECU 2 when the LED 1 is in an energization control period or when the LED is in an off-state. As mentioned above, when the LED 1 is controlled to turn on, three types of the fault states, for example, (A): a battery short circuit fault, (B): an open circuit fault and (C): a ground short circuit fault, occur.

With regard to (A): the battery short circuit fault, the LED 1 is still in energization even if the PWM control is in an off state when the output terminal OUT and the power source terminal VD are connected in short circuit caused by some reasons. In other words, the situation is regarded as a power source short circuit fault. FIG. 2 illustrates that the switch S2 is an on state. With regard to (B): the open circuit fault, the LED 1 cannot be turned on because the output terminal OUT is in an open circuit state in which the output terminal OUT is not connected to the load circuit 4. FIG. 2 illustrates that the switch S1 is in an off state. With regard to (C): the ground short circuit fault, the LED 1 still cannot be turned on since the output terminal OUT and the ground terminal are connected in short circuit. This situation is regarded as a load side short circuit fault. FIG. 2 illustrates the switch S3 is in an on state.

The following describes the fault detection operation in detail with reference to the time chart illustrated in FIG. 4. It is noted that the following description mentions an operation along with the transition of timing by using the times t1 through t21; however, the times t1 through t21 are continuously illustrated for simplicity. In other words, the times t1 through t21 do not necessarily occur continuously, the period mentioned in the following description indicative of each type of fault are in continuous timing.

(A): the battery short circuit fault as one of fault modes in an off-state period where a PWM signal is not outputted is firstly described. With regard to this state, since the MOSFET 7 is in an off-state period in which the PWM control is not carried out, the source of the MOSFET 7 is at a low-level as illustrated in FIG. 4A, and the output voltage VL of the output terminal OUT of the ECU 2 in a normal state is almost at a ground level because an electric charge in the capacitor 6 is discharged as illustrated by a broken line in FIG. 4B.

However, when the output terminal OUT and the power source terminal VD are in short circuit due to having the fault, the output voltage VL of the output terminal OUT is held at a potential level near the power source voltage VD. In this state, the LED 1 is constantly turned on. In this situation, since the output voltage VL is approximately the power source voltage VD, the output voltage VL is larger than the threshold voltage Vth and the output of the comparator 11 is at a high-level (see FIG. 4C) at the time where the battery short circuit fault occurs (i.e., the detection time t1 in FIGS. 4A through 4G).

The abnormality determinator 8f of the controller 8 determines that PWM is in an off-state period since a PWM signal is not outputted from the PWM generator 8. Subsequently, the abnormality determinator 8f determines that the battery short circuit fault as an abnormal state occurs since a high-level signal is inputted from the comparator 11 when PWM is in an off-state period, and outputs an abnormal signal to the detection filter 8e. The detection filter 8e counts the output period of the abnormal signal within a predetermined period through an error counter (see FIG. 4D). When the abnormal signal is still inputted as exceeding the predetermined period, the detection filter 8e determines that there is an abnormality (i.e., at the time t2 in FIGS. 4A through 4G) and outputs an abnormality confirmation signal to the abnormality holder 8d.

The abnormality holder 8d identifies that the output terminal OUT and the power source terminal VD are connected in short circuit since an abnormality confirmation signal is inputted from the detection filter 8e and the battery short circuit fault inputted from the abnormality determinator 8f. With regard to this fault mode, since the LED 1 is turned on in a state where a PWM signal is not outputted, the control such as a protection operation for the load circuit 4 at the ECU 2 side cannot be performed. The abnormality holder 8d sets a BATT short circuit flag that indicates the battery short circuit fault occurrence state and sends the BATT short circuit flag through the serial I/F unit 8a as a diagnostics signal (see FIG. 4F).

On the other hand, the output terminal OUT of the ECU 2 returns to a ground level (see time t3 in FIGS. 4A through 4G) and the output of the comparator 11 is reversed to a low level when it is recovered from the battery short circuit fault. Additionally, in this state, the abnormality determinator 8f determines that it is in a normal state and stops outputting an abnormal signal. Accordingly, the abnormality holder 8d clears the BAIT short circuit flag and transmits the notification to the microcomputer 2a (see FIG. 4F).

The following describes (B): the open circuit fault that occurs in a period where the driving of the MOSFET 7 is controlled by a PWM signal. In a period where PWM is in operation, the MOSFET 7 performs an on or off operation through a PWM signal provided from the PWM generator 8c. For instance, when the PWM signal is at on-Duty at the time t4 (see FIG. 4A), the MOSFET 7 is turned on and the power source voltage VD is fed to the output terminal OUT When it is in a normal state in which the load circuit 4 is connected to the output terminal OUT, the LED 1 is energized and turned on.

In this situation, the abnormality determinator 8f temporarily outputs an abnormal signal to the detection filter 8e since a high level signal is not inputted from the comparator 11 at the time t4 at which the PWM signal is at a high level as on-Duty. In the detection filter 8, the counter is reset at the edge timing when the PWM signal is switched to on-Duty. The detection filter 8e starts counting the output time of the abnormal signal from the abnormality determinator 8f through an error counter (see FIG. 4D). Since it is in a normal state, a high level signal from the comparator 11 is inputted to the abnormality determinator 8f (see FIG. 4C) when the output voltage VL of the output terminal OUT rises nearly to the power source voltage VD and exceeds the threshold voltage Vth at the time t5 within a predetermined time. Since the abnormality determinator 8f clears the abnormal signal in response to this situation, and the detection filter 8e stops the counting operation carried out by the error counter (see FIG. 4D).

Subsequently, when the PWM signal is switched to on-Duty at time t6, the MOSFET 7 is turned off. Accordingly, the output terminal OUT is detached from the power source VD, however, the output voltage Vt. exceeds the threshold voltage Vth due to an electric charge in the capacitor at this time. The abnormality determinator 8f outputs an abnormal signal to the detection filter 8e after a high level signal is outputted from the comparator 11. In the detection filter 8e, the counter is reset at the edge timing where the PWM signal is switched to on-Duty, and the error counter starts counting of the output time of the abnormal signal from the abnormality determinator 8f.

When the electric charge in the capacitor 6 is discharged through the LED 1 since shifting to a normal state, the LED 1 is turned off and the output voltage VL of the output terminal OUT shifts to the ground level. Accordingly, when the output voltage VL is less than or equal to the threshold voltage Vth at the time t7 within a predetermined time, a low level signal from the comparator 11 is inputted to the abnormality determinator 8f. The abnormality determinator 8f clears the abnormal signal in response to this situation, therefore, the detection filter 8e stops the counting operation carried out by the error counter.

The following describes the situation in which the open circuit fault occurs. In this situation, when the PWM signal is switched to on-Duty at the time t8, the MOSFET 7 is turned on and the power source voltage VD is fed to the output terminal OUT. In this situation, the output voltage VL of the output terminal OUT rises closely to the power source voltage VD through the charging of the capacitor even when the load circuit 4 is not connected to the output terminal OUT. Accordingly, the LED 1 is not turned on; however, the load open circuit fault cannot be determined during the on-Duty period.

At this time, the abnormality determinator 8f temporarily outputs the abnormal signal since the high level signal is not inputted from the comparator 11 at the time where the PWM signal is switched to a high level at on-Duty. In the detection filter 8e, the counter is reset at the edge timing where the PWM signal is switched to on-Duty, and the error counter starts counting of the output time of the abnormal signal from the abnormality determinator 8f. Although it is in the load open circuit fault state, when the output voltage VL rises closely to the power source voltage VD and exceeds the threshold voltage Vth at the time within a predetermined time, the high level signal from the comparator 11 is inputted to the abnormality determinator 8*f*. Since the abnormality determinator 8*f* clears the abnormal signal in response to this situation, the detection filter 8*e* stops the counting operation carried out by the error counter.

Subsequently, when the PWM signal is switched to off-Duty at the time t10, the MOSFET 7 is turned off. Accordingly, the output terminal OUT is detached from the power source VD; however, the output voltage VL exceeds the threshold voltage Vth due to the electric charge in the capacitor 6 at this time point. The abnormality determinator 8*f* outputs the abnormal signal to the detection filter 8*e* since the high level signal is not inputted from the comparator 11. In the detection filter 8*e*, the counter is reset at the edge timing in which the PWM signal is switched to on-Duty, and the error counter starts counting of the output time of the abnormal signal from the abnormality determinator 8*f*.

Since it is in the load open circuit fault state, the electric charge in the capacitor 6 is not discharged through the LED 1. The voltage gradually becomes lower when, for example, the leakage in the IC 3 occurs. Therefore, a decrease in the output voltage VL of the output terminal OUT takes longer time as compared with the normal operation so that the output voltage VL is not less than the threshold voltage Vth at the time t11 after the lapse of a predetermined time.

As a result, the abnormality determinator 8*f* receives the high level signal from the comparator 11 and outputs the abnormal signal to the detection filter 8*e* at time t11. The detection filter 8*e* determines the abnormal state and outputs the abnormality confirmation signal to the abnormality holder 8*d* at the time t11 after the lapse of a predetermined time subsequent to the reset of the counter. Since the abnormality holder 8*d* receives information with regard to the type of abnormality from the abnormality determinator 8*f*, the abnormality holder 8*d* determines that the abnormal state is the load open circuit fault. The abnormality holder 8*d* sets the OPN fault flag of the open circuit fault at the time t11 (see FIG. 4G), and sends the OPN fault flag as the diagnostics signal to the microcomputer 2*a*.

Subsequently, since the output voltage VL becomes less than or equal to the threshold voltage Vth at the time t12, the output of the comparator 11 is at the low level. Although the abnormality determinator 8*f* stops the output of the abnormal signal, the detection state of the open circuit fault is held since the abnormality confirmation signal is held by the abnormality holder 8*d* at this time point. Thereafter, the abnormality confirmation signal is held until the clear signal for clearing abnormality is inputted from the microcomputer 2*a*.

It is noted that when the open circuit fault occurs, since the output voltage VL exceeds the threshold voltage Vth when the PWM signal is at off-Duty identical to the PWM signal in an off state, the situation is conditionally similar to (A): the battery short circuit fault. Accordingly, in this situation, the BATT short circuit flag may also be set in addition to the OPN fault flag. In fact, when the OPN fault flag and the BATT short circuit flag are both set, the slate of the OPN fault flag is firstly adopted so that the open circuit fault can be determined.

Next, the following describes (C): the ground short circuit fault as one of the fault modes during an operation period where the MOSFET 7 is controlled to be driven by the PWM signal. In the following description, the situation in which the PWM signal is shifted to on-Duty when the ground short circuit fault occurs is classified as Case 1; and the situation in which the ground short circuit fault occurs during the on-Duty period where the LED 1 is turned on is classified as Case 2. Both cases are separately described.

Firstly, the Case 1 is described. In this situation, the ground short circuit fault has already occurred and the output terminal OUT is connected to the ground. Accordingly, the LED 1 of the load circuit 4 cannot be energized even when the PWM signal is switched to on-Duty.

In this situation, when the PWM signal is switched to on-Duty at the time t13, the MOSFET 7 is turned on and the output terminal OUT is fed to the power source voltage VD. However, since the output terminal OUT is connected to the ground in short circuit, the short current continuously flows so that the voltage does not rise.

In this situation, the abnormality determinator 8*f* temporarily outputs the abnormal signal to the detection filter 8*e* since the high level signal from the comparator 11 is not inputted at the time point where the PWM signal is switched to the high level at on-Duty. In the detection filter 8*e*, the counter is reset at the edge timing where the PWM signal is switched to on-Duty and the error counter starts counting the output time of the abnormal signal from the abnormality determinator 8*f*.

Subsequently, the abnormality determinator 8*f* continuously outputs the abnormal signal when the high level signal from the comparator 11 is not inputted at the time t14 after the lapse of a predetermined time in which the output voltage VL does not rise. The detection filter 8*e* determines the abnormal state and outputs the abnormality confirmation signal to the abnormality holder 8*d* at the time t14 after the lapse of a predetermined time subsequent to the reset of the counter.

The abnormality holder 8*d* receives the information with regard to the type of abnormality from the abnormality determinator 8*f*; therefore, the abnormal state is determined as the ground short circuit fault. The abnormality holder 8*d* outputs the interruption signal to the output controller 8*c* in order to stop the PWM signal when having the ground short circuit fault. Therefore, the MOSFET 7 is shifted to an off state, and the output voltage VL is also fixed to the ground level. Additionally, the abnormality holder 8*d* sets the GND short circuit flag indicative of the ground short circuit fault (see FIG. 4E), and sends the GND short circuit flag as the diagnostics signal to the microcomputer 2*a*.

It is noted that the on-Duty signal and the output voltage VL of the output terminal OUT under the normal PWM operation are illustrated by a broken line as a comparison (see FIG. 4B). When the PWM signal is stopped at the time t14, an overcurrent caused by the ground short circuit fault continuously flowing into the MOSFET 7 can be prevented.

Subsequently, at the time t15 where the PWM signal is shifted to off-Duty illustrated by a broken line in FIGS. 4A through 4G, the abnormality determinator 8*f* is provided by the low level signal from the comparator 11. Accordingly, since it is understood that the PWM signal provided from the PWM generator 8*b* is shifted to the off-Duty, the abnormality determinator 8*f* determines this situation within a short time and dears the GND short circuit flag at the time t16 (see FIG. 4E).

The following describes Case 2. In this situation, when the LED 1 is once turned on normally, the ground short circuit fault or any similar fault occurs during an on-Duty period and the LED 1 is shifted to an off state. When the PWM signal is switched to on-Duty at the time t17, the MOSFET 7 is turned on and the power source voltage VD is fed to the output terminal OUT. Thus, the LED 1 is energized to turn on.

In this situation, the abnormality determinator 8f temporarily outputs the abnormal signal to the detection filter 8e since the high level signal from the comparator 11 is not inputted at the time point where the PWM signal is switched to the high level at on-Duty as similarly described above. In the detection filter 8e, the counter is reset at the edge timing in which the PWM signal is switched to on-Duty, and the error counter starts counting the output time of the abnormal signal from the abnormality determinator 8f. Since it is in the normal state, when the output voltage VL rises closely to the power source voltage VD and exceeds the threshold voltage Vth at the time t18 within a predetermined time, the high level signal from the comparator 11 is inputted to the abnormality determinator 8f. Since the abnormality determinator 8f clears the abnormal signal in response to this situation, the detection filter 8e stops the counting operation carried out by the error counter.

Subsequently, during the on-Duty period, the output voltage VL decreases to a predetermined level less than or equal to the threshold voltage and then decreases to the ground level, when the short circuit partially occurs at the time t19 and the ground short circuit fault occurs. When the output voltage VL is less than or equal to the threshold voltage Vth, the comparator 1 outputs the low level signal (see FIG. 4C).

In this situation, since the PWM signal is switched to the low level signal from the comparator 11 when the PWM signal is at the high level at on-Duty, the abnormality determinator 8f temporarily outputs the abnormal signal to the detection filter 8e. In the detection filter 8e, the error counter starts counting the output time of the abnormal signal from the abnormality determinator 8f since the time t19 in which the output of the comparator 11 is changed to the low level.

Subsequently, at the time t20 after the lapse of a predetermined time in which the output voltage VL is still at the low level, the detection filter 8e determines the abnormal state and outputs the abnormality confirmation signal to the abnormality holder 8d at the time t20 after the lapse of a predetermined time.

Since the abnormality holder 8d receives information with regard to the type of abnormality from the abnormality determinator 8f, the abnormal state is determined as the ground short circuit fault. The abnormality holder 8d outputs the interruption signal to the output controller 8c to stop the PWM signal. Therefore, the MOSFET 7 is shifted to an off state, and the output voltage VL is also fixed to the ground level. In addition, the abnormality holder 8d sets the ground short circuit flag that indicates the ground short circuit fault (see FIG. 4E), and then sends the GND short circuit flag as the diagnostics signal to the microcomputer 2a. Thus, the overcurrent caused by the ground short circuit fault continuously flowing into the MOSFET 7 can be prevented.

Subsequently, at time t21 in which the PWM signal is shifted to off-Duty illustrated by a broken line in FIG. 2, the low level signal from the comparator 11 is provided to the abnormality determinator 8f. Accordingly, the abnormality determinator 8f clears the GND short circuit flag since it is understood that the PWM signal provided from the PWM generator 8b is shifted to off-Duty (see FIG. 4E).

With regard to the detection operation in each of the fault modes described above, the detectable period is summarized in FIG. 5. The open circuit fault in which the switch S1 is turned off is detected when the PWM is operated in off-Duly. The battery short circuit fault in which the switch S2 is turned is detected when PWM is in an off state in response to the power source short circuit fault. In addition, the ground short circuit fault in which the switch S3 is turned on is detected when the PWM is operated in on-Duty in response to the load side short circuit fault.

According to the present embodiment, the detection of the open circuit fault in which the load circuit 4 is not connected to the output terminal OUT of the ECU 2 can detect that the decrease in the output voltage VL is slow when the PWM is operated in off-Duty. In addition, since the open circuit fault at the time of the LED 1 in the PWM operation is determined, there is no any operation for detection that turns on the LED 1 in the PWM operation during the off-state period so that the detection operation is constantly performed without causing sense of discomfort.

In addition, in a case of having the battery short circuit fault in which the load circuit 4 is directly connected to the power source terminal VD, the LED 1 in the load circuit 4 is energized without any conditions and is turned on continuously. In this situation, it can be determined that the output voltage VL exceeds the threshold voltage when the PWM is operated in an off state.

Moreover, in a case of having the ground short circuit fault in which the output terminal OUT is connected to the ground in short circuit, the output voltage cannot be provided to the load circuit and hence the LED 1 cannot be energized. In this situation, it can be detected that the output voltage VL of the output terminal OUT does not rise when the PWM signal is operated at the time of on-Duty. Additionally, in this situation, since the excess current flows into the MOSFET 7 when the MOSFET is in an on state, the PWM signal is interrupted and is shifted to an off state so that the overcurrent continuously flowing into the MOSFET 7 can be prevented.

According to the present embodiment, the comparator 11 used as the configuration for performing each of the above-mentioned detection operations can be shared by operating with the detection comparator for detecting an overcurrent through time division so that the present embodiment can be operated at lower cost with the reduction in components for the circuit configuration.

(Second Embodiment)

Figure 6:
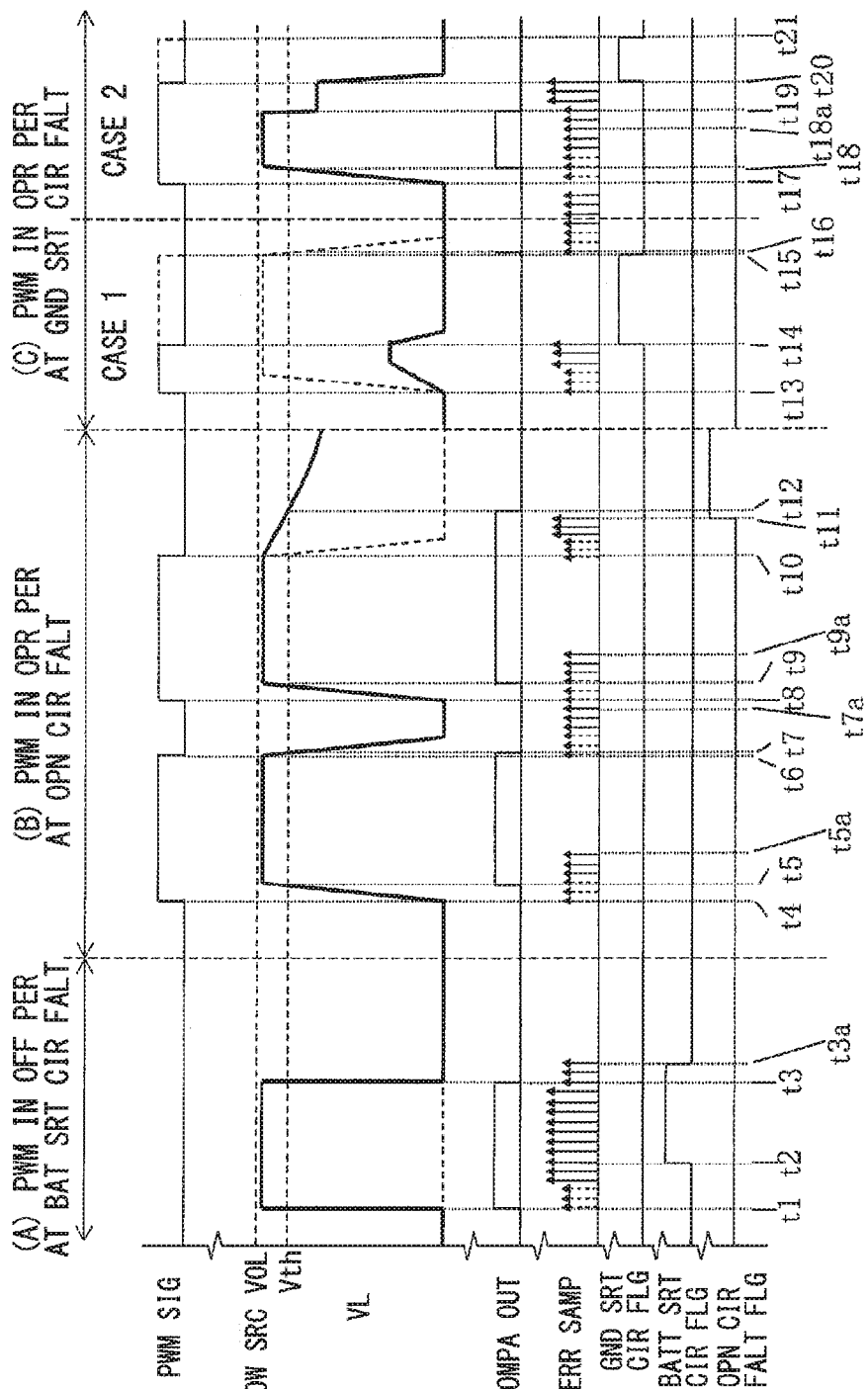
FIGS. 6A through 6G are time charts that indicate a signal in each respective module according to a second embodiment.

FIG. 6 illustrates a second embodiment. The following describes the parts that are different from the one in the first embodiment. The present embodiment provides the erroneous detection prevention when the fault detection in the first embodiment is carried out.

The controller 8 carries out an error sampling in a predetermined time interval. When the output of the comparator 11 corresponds to the state of the PWM signal, the controller 8 does not output an error signal since it is in a normal state. On the other hand, when the output of the comparator 11 does not correspond to the state of the PWM signal, the controller 8 is in a state where the error signal is not immediately outputted, and when this state occurs three times in a row, the abnormal state is detected as the output of the error sampling at the fourth time of the occurrence of this state. In this situation, the controller 8 provides the same filter for three occurrences. Since the inputted signal is confirmed when the same signal is inputted three times in a row, the erroneous detection caused by noise in response to this situation is prevented and then either a normal state or an abnormal state is determined.

FIG. 6D illustrates the timing of a signal processed by the error sampling through the controller 8 with arrows. Since the signal indicative of the abnormal state is detected but not outputted to the detection filter 8e at the first three occurrences, the signal is illustrated by an arrow with broken lines. In addition, the signal indicative of the abnormal state is illustrated by an arrow with a solid line. Then, the sampling result under the normal state is illustrated by an arrow with a shorter solid line.

The following describes the particular detection operation also with the comparison to the detection operation in the first embodiment. First, the following describes (A): the battery short circuit fault in an off period where the PWM signal is not outputted.

The controller 8 determines that the battery short circuit fault as the abnormal state occurs by the error sampling since the high level signal from the comparator 11 is not inputted in a period where the PWM is operated in an off state. In this situation, the controller 8 is in an idle state only in a predetermined period the error sampling signals indicative of the abnormal state in the first three occurrences are not objects to be determined. Subsequently, when the error sampling signal indicative of the abnormal state occurs continuously after the fourth occurrence and then this situation is detected that occurs three times in a row, the abnormal state is determined (see time t2 in FIGS. 6A through 6G) and the abnormal state is confirmed as the determination result. At time t2, the controller 8 sets the BATT short circuit flag indicative of the occurrence of the battery short circuit fault and sends the BATT short circuit flag to the microcomputer 2a as the diagnostics signal.

On the other hand, when it is recovered from the battery short circuit fault, the output terminal OUT of the ECU 2 returns to the ground level at time t3 in FIGS. 6A through 6G, and the output of the comparator 11 is inverted to the low level. In addition, the controller 8 under this situation stops the output of the abnormal signal by determining that the situation is in the normal state, and sends the information to the microcomputer 2a to clear the BATT short circuit flag.

The following describes (B): the load open circuit fault as the fault mode in a period where the MOSFET 7 is controlled to be driven by the PWM signal. In a period where the PWM is in operation, the MOSFET 7 is turned on or off by the PWM signal provided from the PWM generator 8c. The LED 1 is energized to turn on in response to this situation under the normal state where the load circuit 4 is connected to the output terminal OUT.

In the normal state, the controller 8 detects that the battery short circuit fault as the abnormal state occurs through the error sampling since the high level signal from the comparator 11 is not inputted when the PWM signal is switched to the high level at on-Duty (i.e., time t4 in FIGS. 6A through 6G). The controller 8 does not perform determination with regard to the error sampling at the first three occurrences, and performs detection when the error sampling signal at the fourth occurrence is outputted. In this situation, when it is in the normal state, since the error sampling under the normal state at time t5 where the error sampling is carried out three times, the controller 8 determines that it is in the normal state at the time of determination (Le., at time t5a in FIGS. 6A through 6G).

Additionally, when the PWM signal is switched to off-Duty at time t6, the MOSFET 7 is turned off. Therefore, the output terminal OUT is detached from the power source VD; however, also in this situation, when it is in the normal state, if the error sampling signal after the fourth occurrence in the normal states is generated three times in a row, the controller 8 determines that it is in the normal state at time t7a.

The following describes the situation where (B): the open circuit fault occurs. In this situation, when the PWM signal is switched to on-Duty at time t8, the MOSFET 7 is turned on and the power source voltage VD is fed to the output terminal OUT. In this situation, the output voltage VL rises closely to the power source voltage VD through charging the capacitor even when the load circuit 4 is not connected to the output terminal OUT. Accordingly, even when the LED 1 is not turned on, the open circuit fault is not determined in an on-Duty period.

At this time, the controller 8 performs the similar process as described above; therefore, the controller 8 performs determination at time t9a through the error sampling carried out three times in a row after the fourth time of the error sampling. At this time, the controller 8 determines that it is in the normal state since the high level signal from the comparator is already inputted at time t9.

Subsequently, when the PWM signal is switched to off-Duty at time t10, the MOSFET 7 is turned off. Therefore, although the output terminal OUT is detached from the power source VD, the abnormality is detected through the error sampling since the terminal voltage exceeds the threshold voltage Vth due to the electric charge in the capacitor 6 at this time point. In the state where the open circuit fault occurs, since the discharge of the capacitor 6 is slow, the abnormality is detected after the error sampling subsequent to the fourth occurrence of the error sampling occurs three times in a row and then the controller 8 determines that it is in the open circuit fault at time t11.

Next, the following describes the (C): the ground short circuit fault as the fault mode in a period where the MOSFET 7 is controlled to be driven by the PWM signal. In Case 1, the ground short circuit fault has already occurred, the output terminal OUT is connected to the ground. Thus, the LED 1 in the load circuit 4 cannot be energized even when the PWM signal is switched to on-Duty.

In this situation, when the PWM signal is switched to on-Duty at time t13 and then the MOSFET 7 is turned on, the power source voltage VD is fed to the output terminal OUT. However, since the output terminal OUT is connected to the ground in short circuit, the short-circuit current continuously flows and hence the voltage does not rise. At this time, the controller 8 detects the abnormality at the error samplings three times in a row subsequent to the fourth occurrence of the error sampling, and then the ground short circuit fault is determined at time t14 accordingly.

Additionally, in Case 2, when the LED is once normally turned on, the ground short circuit fault or the similar fault occurs in an on-Duty period and the LED 1 is turned off. When the PWM signal is switched to on-Duty at time t17, the MOSFET is turned on and the power source voltage VD is fed to the output terminal OUT. Accordingly, the LED 1 is energized and turned on. At this time, the controller 8 determines that it is in the normal state at time t18a.

According to the second embodiment, in addition to the effect of the first embodiment, even if the error sampling signal indicative of the abnormality is outputted, the erroneous detection due to a temporary signal caused by, for example, noise can be prevented since either the abnormal state or the normal state is determined when the identical signal is outputted three times in a row, that is, the same requirement is met three times in a row. Thus, the fault can be surely detected in an environment where, for example, the noise is easily generated.

With regard to the above configuration, in the configuration where the identical requirement is met three times in a row when performing the determination of the error sampling signal, an arithmetic process carried out by a logic circuit may be used, or the software which performs logical determination may also be used.

(Third Embodiment)

Figure 7:
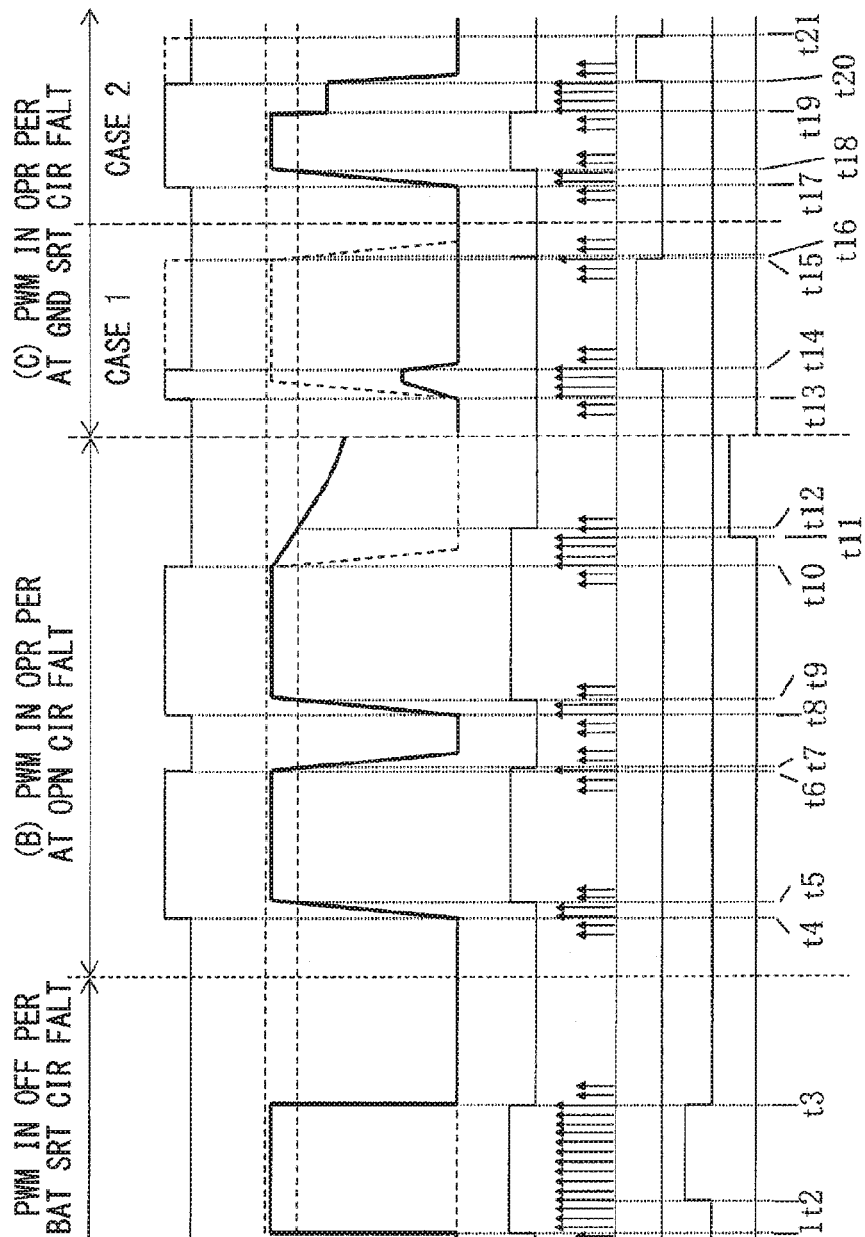
FIGS. 7A through 7G are time charts that indicate a signal in each respective module according to a third embodiment.

FIG. 7 illustrates a third embodiment, and the following describes the parts different from the one in the second embodiment. With regard to the present embodiment, in comparison to the determination of the abnormal state or the normal state in response to the situation where the identical error sampling signal is outputted three times in a row in the second embodiment, the controller 8 determines whether it is in the normal state or the abnormal state when the comparator 11 outputs the identical state four times in a row.

Accordingly, the controller 8 provides a filter in which whether the identical requirement is met four times in a row in order to determine the output of the comparator 11. The controller 8 outputs the error sampling signal indicative of abnormality when the output level of the comparator 11 does not corresponds to the state of the PWM signal. However, the abnormal state is determined when the error sampling signal indicative of the abnormality is detected 4 times in a row (i.e., at times t2, t11, t14 and t20 in FIGS. 7A through 7G). On the other hand, in a process where the error sampling signal is detected four times, the controller 8 determines that it is in the normal state when the error sampling signal indicative of the normal state in response to the PWM signal is detected.

Accordingly, the determination similar to the one in the first embodiment is performed at the fourth occurrence of the error sampling signal when the identical error sampling signals are detected continuously and at the time point after the lapse of a predetermined time subsequent to the time point where the PWM signal is changed.

It is noted that the function of preventing the erroneous operation caused by, for example, noise can be improved as similar to the second embodiment by setting a filter for determining whether the identical requirement is met five or more times or not.

(Fourth Embodiment)

FIGS. 8 through 11 illustrate a fourth embodiment, and the following describes the parts different from the one in the first embodiment. The first embodiment illustrates the configuration that drives the load circuit at the high side. In contrast, in the present embodiment, the load circuit 4 is connected to the side of the power source VD. The present embodiment illustrates a circuit to be driven at the low side.

Figure 8:
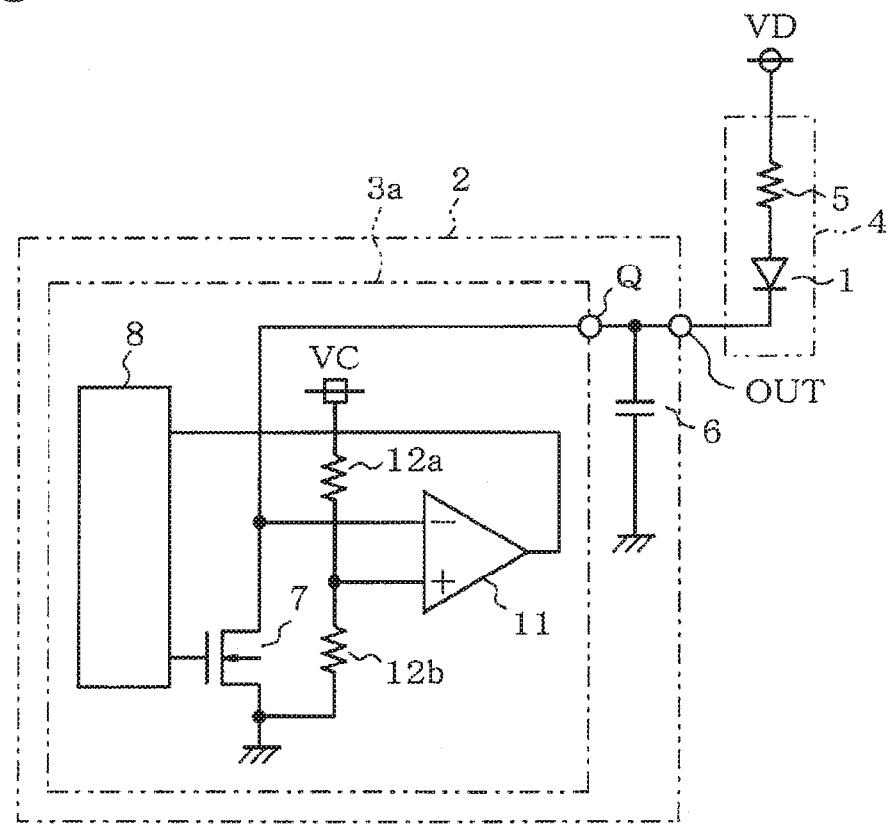
FIG. 8 is an electrical configuration according to a fourth embodiment.

The IC 3a for controlling the LED 1 to turn on is provided in FIG. 8. The load circuit 4 is a series circuit in which the LED 1 and the resistor 5 are connected. The load circuit 4 is connected between the power source terminal VD and the output terminal OUT of the ECU 2.

In the IC 3a, the n-channel type MOSFET 7 for energizing the LED 1 is connected between the output terminal OUT and the ground. The drain of the MOSFET 7 is connected to the non-inverting input terminal of the comparator 11. A division circuit 12 including the resistors 12a and 12b is provided between the ground and the power source terminal VC for providing the direct current voltage VD different from the power source VD. The common connection point between the resistor 12a and the resistor 12b is connected to the inverting input terminal of the comparator 11 and provides the threshold voltage Vth.

Figure 9:
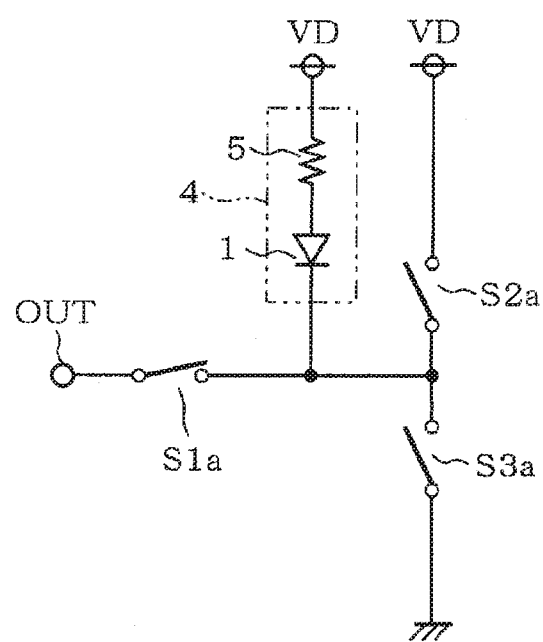
FIG. 9 is a model that illustrates a fault mode.
Figure 10:
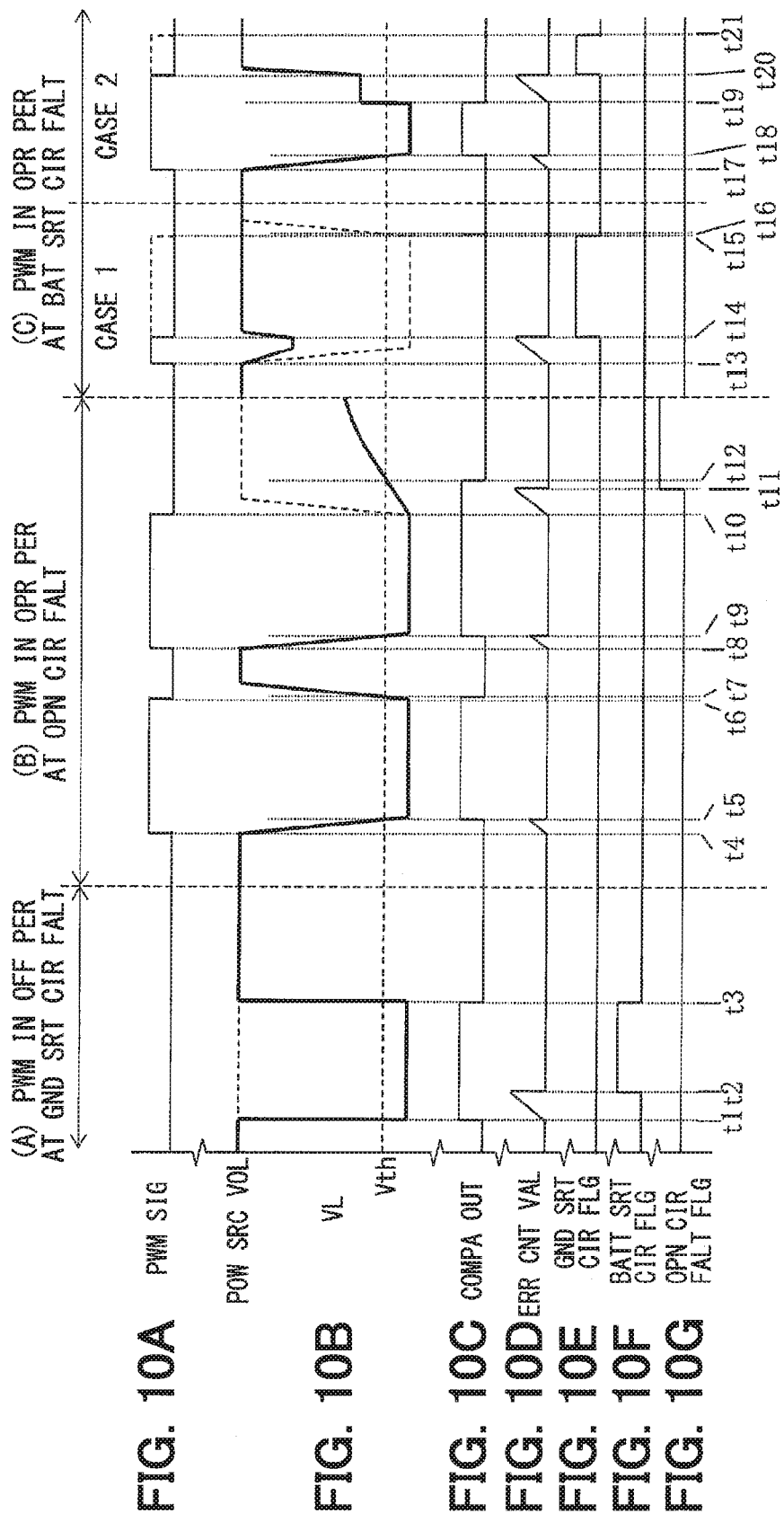
FIGS. 10A through 10G are time charts that indicate a signal in each respective module.

FIG. 9 shows a model of a fault mode of the load circuit 4 with switches S1a through S3a. The load circuit 4 is connected to the output terminal OUT of the ECU 2 that corresponds to the connection relation in FIG. 8. However, this section shows the normal state when the switch S1a is in an on state, and shows that the load open circuit fault occurs when the switch S1a is in an off state.

In addition, FIG. 9 illustrates that the load short circuit fault in which the load circuit 4 is in short circuit occurs when the switch S2a is in an on state. It is noted that the first embodiment shows the similar load short circuit fault when the switch S3 is in an on state. Moreover, FIG. 9 shows that the power source short circuit fault in which the load circuit 4 is constantly energized when the switch S3a is in an on state. Similarly, the first embodiment shows that the power source short circuit fault occurs when the switch S2 is in an on state.

With regard to the operation of the above configuration, as shown in FIGS. 10A through 10G, when the MOSFET 7 is turned off, and the output terminal OUT is switched to the high level, and the output terminal OUT has a potential close to the power source voltage VD. Hence, the LED 1 of the load circuit 4 is not energized. In addition, when the MOSFET 7 is turned on and the output terminal is switched to the low level, the output terminal has a potential which is close to the ground potential level. Hence, the LED 1 of the load circuit 4 is energized to turn on.

FIG. 11 summarizes the detectable period for the detection operation in each of the fault modes. In other words, the open circuit fault in which the switch S1a is turned off is detected at the time where the PWM is operated at off-Duty. The ground short circuit fault in which the switch S3a is turned on is detected when the PWM is in an off state in response to the power source short circuit fault. In addition, the battery short circuit fault in which the switch S2a is turned on is detected when the PWM is operated at on-Duty in response to the load side short circuit fault.

According to the fourth embodiment, the output voltage VL of the output terminal OUT has a reverse relation with the one in the first embodiment between the power source voltage VD and the ground terminal. However, other than that, the LED 1 of the load circuit 4 is controlled to turn on by the operation which is substantially similar to the one in the first embodiment, and the controller 8 similarly performs the detection operation for the fault mode. Accordingly, the effects similar to the one in the first embodiment are generated.

(Fifth Embodiment)

FIGS. 12A through 12H illustrate a fifth embodiment, and the following illustrates the parts different from the one in the second embodiment. The present embodiment illustrates the particular specifications. In other words, with regard to the above-mentioned detection operation, since there is generally a variation in the capacitance value of the capacitor 6, the variation occurs in the detection operation after delivery when the threshold voltage Vth is set uniformly.

FIG. 12A illustrates that the time constant varies when the output voltage NL drops in a case where the LED 1 is turned off caused by the variation in the capacitance value of each capacitor 6 at the time of delivery inspection after manufacturing a product.

When the capacitance value of the capacitor 6 is proper, as shown by the solid line in FIG. 12A, the output voltage VL reaches the threshold voltage Vth from time t3 to time t4b in a case where the PWM signal is switched to off-Duty. In contrast, when the capacitance value of the capacitor 6 is smaller or larger, as shown by the broken lines in FIG. 12A, the output voltage VL reaches the threshold voltage Vth from time t3 to time t4a or from time t3 to time t4c in a case where the PWM signal is switched to off-Duty.

Accordingly, when it is assumed that the voltage drops at an expected value with a proper capacitance value after delivery, a standard detection operation is performed by adjusting the detection time tx (i.e., tx=t4n−t3, where n is a, b, c, . . . etc.) so that the voltage value is substantially similar to the one at time t4b. Accordingly, the differentiation with the state where the voltage drops in the abnormal state where a fault occurs can be properly performed as shown in FIG.

12F. In other words, the proper abnormality determination operation can be applied by learning the proper detection time tx in the normal state when delivering a product and sets the learned value as a base value after delivery.

According to the fifth embodiment, the proper abnormality detection operation after delivery can be performed by learning the detection time tx and the capacitance value of the capacitor 6 according to the inspection of an error caused by variation in the capacitance value of the capacitor 6 at the time of delivering a product even if it is applied to an actual product.

It is noted that the similar operation by adjusting the threshold voltage Vth for the detection time tx can be performed in the above embodiment.

(Other Embodiments)

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure. For example, the present disclosure can be changed or expanded in the following manner.

A predetermined time can be set to a proper time after the lapse of time required for confirming the state of the output voltage when the detection operation is performed by the controller 8 within a predetermined time after the time point where the PWM signal is switched to off-Duty.

The component other than the LED 1 can be used as the load element. Additionally, the load element is not limited to an element to be turned on or off through energization. The resistor 5 for constituting the load circuit 4 may be arranged accordingly. Alternatively, other elements may be used as the resistor 5.

The PWM signal is used as a repetitive pulse provided to the gate of the MOSFET 7 from the controller 8; however, the pulse signals other than the PWM signal may be used for turning on or off, for example, the LED 1.

The present disclosure illustrates the capacitor 6 is connected between the output terminal OUT and the ground, however, the capacitor 6 may be connected to a predetermined potential other than the ground.

The present disclosure describes that the filter in which the identical requirement is met three times in a row is used in the second embodiment; and the filter in which the identical requirement is met four times in a row is used in the third embodiment. However, it is not restricted to the above situations. Any accurate determination can be performed by setting the number of occurrences for checking whether the identical requirement is met in response to the occurrence state of noise depending on, for example, the usage environment, or the relation between the determination time and the certainty of determination.

What is claimed is:

1. A load driving circuit, comprising:
a driving circuit that supplies a predetermined voltage to a load element connected to an output terminal by a repetitive pulse when the driving circuit is in a driven state;
a capacitor that is connected between the output terminal and a terminal having a predetermined potential level;
a comparison circuit that compares an output voltage of the capacitor and a threshold voltage, which is predetermined, and detects an overcurrent by a time division control; and
a determination circuit that, when the driving circuit is in the driven state, determines an open circuit fault state in a case where a comparative output is not obtained before a predetermined time elapses after a time point where the repetitive pulse into the load element is cut off, wherein
the comparative output indicates a change in which the output voltage of the capacitor from the comparison circuit reaches the threshold voltage, and
the open circuit fault state is a state in which the load element is disconnected from the output terminal.

2. The load driving circuit according to claim 1,
wherein the load element includes a light emitting diode.

3. The load driving circuit according to claim 1,
wherein, when the driving circuit is in the driven state, the determination circuit determines a load side short circuit fault state in a case where the comparative output is not obtained before a predetermined time elapses after a time point where the load element is driven by the repetitive pulse,
wherein the load side short circuit fault state is a state in which an energization path to the load element is in short circuit.

4. The load driving circuit according to claim 1,
wherein, when the driving circuit is not in the driven state, the determination circuit determines a power source short circuit fault state in which the load element is energized in a case where the comparative output is obtained.

5. The load driving circuit according to claim 1,
wherein the driving circuit is connected to a power source terminal side, and the load element is driven at a high side and is connected to a ground side.

6. The load driving circuit according to claim 1,
wherein the driving circuit is connected to a ground terminal side, and the load element is driven at a low side and is connected to a power source terminal side.

7. A load driving circuit, comprising:
a driving circuit that supplies a predetermined voltage to a load element connected to an output terminal by a repetitive pulse when the driving circuit is in a driven state;
a capacitor that is connected between the output terminal and a terminal having a predetermined potential level;
a comparison circuit that compares an output voltage of the output terminal and a threshold voltage, which is predetermined; and
a determination circuit that, when the driving circuit is in the driven state, determines an open circuit fault state in a case where a comparative output is not obtained before a predetermined time elapses after a time point where the repetitive pulse into the load element is cut off, wherein
the comparative output indicates a change in which the output voltage from the comparison circuit reaches the threshold voltage,
the open circuit fault state is a state in which the load element is disconnected from the output terminal,
when the driving circuit is in the driven state, the determination circuit determines a load side short circuit fault state in a case where the comparative output is not obtained before a predetermined time elapses after a time point where the load element is driven by the repetitive pulse, and
the load side short circuit fault state is a state in which an energization path to the load element is in short circuit.

8. A loading driving circuit, comprising:
a driving circuit that supplies a predetermined voltage to a load element connected to an output terminal by a repetitive pulse when the driving circuit is in a driven state;
a capacitor that is connected between the output terminal and a terminal having a predetermined potential level;
a comparison circuit that compares an output voltage of the output terminal and a threshold voltage, which is predetermined; and
a determination circuit that, when the driving circuit is in the driven state, determines an open circuit fault state in a case where a comparative output is not obtained before a predetermined time elapses after a time point where the repetitive pulse into the load element is cut off, wherein
the comparative output indicates a change in which the output voltage from the comparison circuit reaches the threshold voltage,
the open circuit fault state is a state in which the load element is disconnected from the output terminal, and
when the driving circuit is not in the driven state, the determination circuit determines a power source short circuit fault state in which the load element is energized in a case where the comparative output is obtained.

9. The load driving circuit according to claim 1, wherein the threshold voltage is generated by a resistor and a current source.

\* \* \* \* \*